Aug. 5, 1969  A. ZICHE  3,458,967
APPARATUS FOR CHECKING OF IMPURITIES
Filed Feb. 18, 1966  8 Sheets-Sheet 1

INVENTOR:
A. Ziche
BY
Richards & Geier
ATTORNEYS

Aug. 5, 1969 A. ZICHE 3,458,967
APPARATUS FOR CHECKING OF IMPURITIES
Filed Feb. 18, 1966 8 Sheets-Sheet 4

INVENTOR:
A. Ziche
By
Richards & Geier
ATTORNEYS

Aug. 5, 1969  A. ZICHE  3,458,967
APPARATUS FOR CHECKING OF IMPURITIES
Filed Feb. 18, 1966  8 Sheets-Sheet 5

INVENTOR:
A. Ziche
BY
Richards & Geier
ATTORNEYS

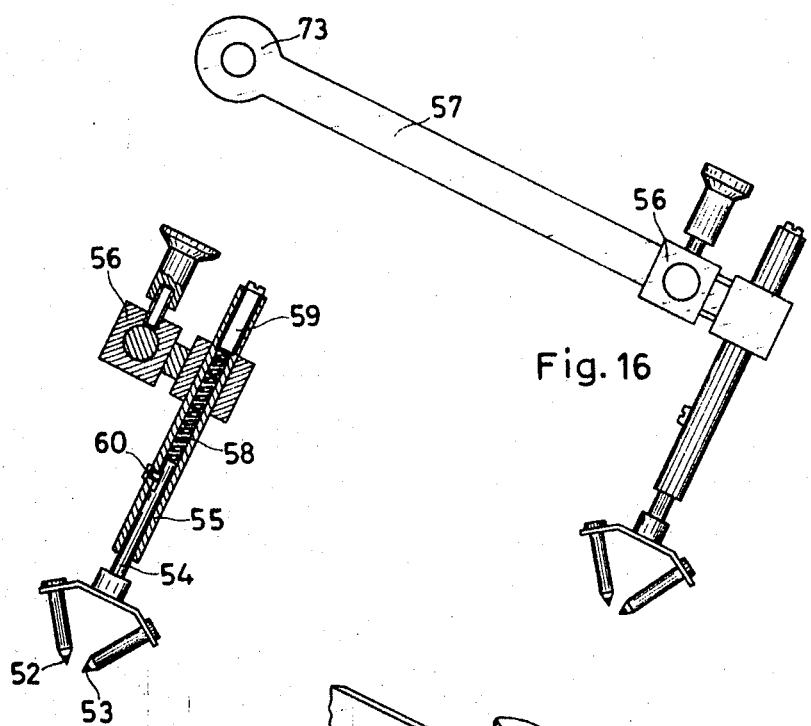
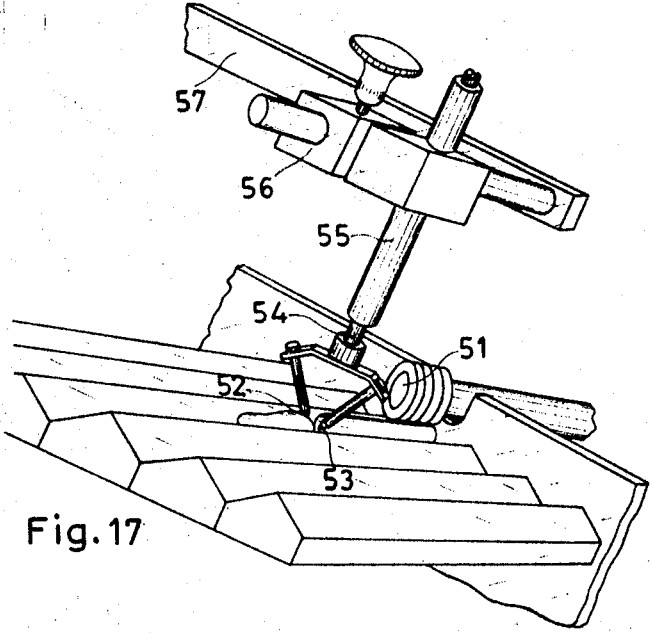

Aug. 5, 1969 A. ZICHE 3,458,967
APPARATUS FOR CHECKING OF IMPURITIES
Filed Feb. 18, 1966 8 Sheets-Sheet 8

INVENTOR:
A. Ziche
BY
Richards & Geier
ATTORNEYS

United States Patent Office 3,458,967
Patented Aug. 5, 1969

3,458,967
APPARATUS FOR CHECKING OF IMPURITIES
Arrigo Ziche, Vicenza, Italy, assignor to Brevetti C.E.A.
S.p.A., Vicenza, Italy, a corporation of Italy
Filed Feb. 18, 1966, Ser. No. 528,444
Claims priority, application Italy, Mar. 9, 1965,
5,153/65
Int. Cl. B65b 57/00
U.S. Cl. 53—54                                                                13 Claims

ABSTRACT OF THE DISCLOSURE

An apparatus for checking impurities in phials or other transparent tubular members is combined with a device for scoring the phials and has a cabinet which is desk-like in shape. The apparatus includes at least some of the following devices: a feeding device with an inclined surface for the phials; a stepped conveyor device with push members moving the phials one step for each working cycle of the apparatus; a rotary roller which rotates the phials to cause suspension of any possible impurities in liquids contained in the phials; a checking station, the rotary roller being located in a position close to the checking station; the checking station includes a device for illuminating the phials and a lens to facilitate their viewing by an operator; a device for discharging phials rejected by the operator from the stepped conveyor; the aforesaid scoring device for necks of phials and a packing device located at the end of the stepped container.

---

The present invention concerns an apparatus for the visual checking of the impurities contained in phials or transparent tubular bodies, particularly phials containing pharmacutical products; the apparatus being also provided with a device for scoring the necks of the phials to facilitate opening by hand, without the need of auxiliary devices.

As is known, at present checking of any impurities contained in the phials is manually effected after agitation of the liquid contained therein, so as to place in suspension any impurities present therein, by gripping one or more phials by the tip and raising them to eye level where they are illuminated by a suitable light source.

During examination of the phials the operator subjects them to subsequent reversing operations so as to bring any impurities into suspension which, during the movement of the phials to eye level, may have become deposited in the tip or at the bottom thereof. Naturally, the various stresses imposed on the liquid cause the formation of small air bubbles which must be clearly distinguished from the impurities by the operator, these air bubbles make the distinction of impurities difficult. Phials found by the operator to be unsuitable must be discarded.

This method obviously requires a good deal of labour and is also rather tiring for the workers employed therein, who are usually women. A few devices have been constructed to facilitate the examination of phials or transparent tubular bodies, which consist substantially of lenses having white and black screens for distinguishing various impurities, but they also require an operator to manipulate the phials to be checked.

It follows therefore that the entire cycle of work, filling, closing, washing and packing of phials and tubular bodies in the pharmacutical industry, is automated except with regard to the checking of impurities which is a very costly and unreliable manual process.

When it is also considered that the operation of opening the phials is at present effected, for the most part, by incising the glass neck of the phial with a small metal saw and then subjecting the neck itself to bending until the glass is broken.

However, it is rare that the entire circumference of the neck of the phial is completely incised, and therefore, in the act of rupture, minute fragments of glass result which fall into the phial which, before opening, is in a state of vacuum on account of the cooling of the air within it, which takes place subsequent to the closing of the phial in a flame.

In addition to this, account must be taken of the cost of the small saws and the labour necessary to place them in the boxes containing the phial.

To surmount these disadvantages, phials are now being produced, provided with an elongated neck within which a collar is deposited of a special vitrifying varnish which, when heated together with the phial, causes tension in glass and thus facilitating the breaking thereof.

This method however involves considerable wastage from breakages during the working phases. Also the molecular tension, created in the glass by the presence of the vitrifying varnish tends, in time, to become stabilised, neutralising the effect of the latter and preventing this method being used for phials which may remain stored for a long time.

In addition to this, other systems have been adapted involving scoring phials along a short line of the neck, indicated by a coloured point. In this case also, many occurrances of breakage have been found during the working cycle, apart from the fact that the opening of the phial frequently causes the formation of glass fragments.

With the adoption of the present invention, however, a device has been achieved suitable for mass production in industry by automatically effecting all the operations of transport and agitation of the phials and concentrating the attention of the operator on the checking of any impurities contained in the liquid in the phials.

According to the present invention an apparatus for checking the impurities contained in phials or transparent tubular members with an attached scoring device for the opening thereof, formed by a cabinet apparently similar to a desk is characterised by the feature that it is provided with the following devices considered jointly or in any partial combination thereof:

(a) A feeding device having an inclined plane for the phials or tubular bodies to be checked, (b) A stepped conveyor device, provided with push members which transfer the phials or tubular bodies by one step with each working cycle of the machine, (c) A rotatable roller which, by coming alternatively in contact with the phials or tubular bodies in a position preceding the checking position, rotates them, compelling any impurities present in the liquid to be suspended, (d) A checking station comprising a device for illuminating the phials or tubular bodies and a lens to facilitate viewing thereof, (e) A device for the discharge from the stepped conveyor of the phials rejected by the operator, (f) A device for scoring the neck of the phials facilitating manual snapping thereof, (g) A packing device, disposed at the end of the stepped conveyor.

One of the main features of the invention consists in the fact that the phial is illuminated along its own axis, bringing into relief the presence of any impurities, by reflection in a direction inclined relative to the axis of the phials.

Such an arrangement makes it possible to bring into relief any impurities, for example, glass fragments or powdered glass which, on account of their transparency, would not be identified by the normal methods of manual control in use at present.

The apparatus also allows for a complete scoring of the entire neck of the phials, facilitating the opening thereof by a simple rupture of the neck, without the danger of the formation of glass splinters.

In this manner, a considerable reduction in the cost of checking is achieved, with great physical relief to the operator and a solution to the problem of the opening of the phials.

The apparatus comprises an inclined feeding surface which feeds by gravity the stepped conveyor having moveable push members which advance the phials or tubular bodies by one step with each working cycle of the machine.

In a particular position of the stepped conveyor, a rotatable roller is provided rotated by a motor, which roller, being lowered at intervals, is in contact with the phial or tubular body rapidly rotating said body.

The liquid in the phial or tubular body is therefore obligated to rotate, compelling any impurities contained therein to move into suspension.

The phial or tubular body is then transferred to the checking position where it is illuminated by a beam of light along its longitudinal axis.

In the illuminated position the operator observes the phial or tubular body through a magnifying lens, when it is stationary, whilst the liquid, with any impurities present in suspension therein, continues to rotate because of its inertia.

By means of a push button, the operator expels the phials or tubular bodies to be discarded which leave the stepped conveyor at the position immediately after the checking position.

The phials or tubular bodies, considered suitable by the operator then continue their progress on the stepped conveyor, eventually being subjected to the scoring operation by means of a suitable device comprising one or more diamond points and a rotating roller which is in contact with the phial or tubular body and imposing a rotary movement thereon.

A suitable packing device located at the end of the stepped conveyor, neatly introduces the phials or tubular bodies into containers until the latter are completely filled.

The apparatus will be described further, by way of example, with reference to the accompanying drawings in which:

FIG. 15 shows the utensil carrying arm of the device for the scoring of the phials, in a longitudinal section;

FIG. 16 is an external view thereof.

FIG. 17 shows the scoring device unit in perspective;

Figure 1:
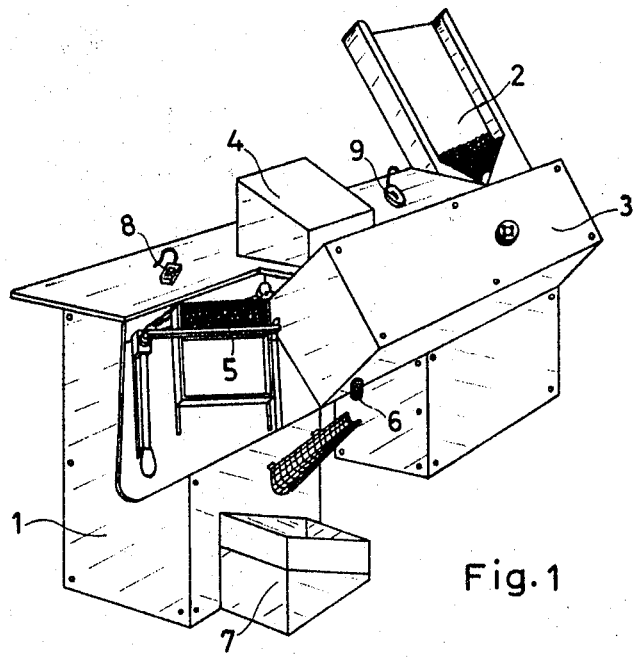
FIG. 1 is a perspective view from the rear side of the entire apparatus.
Figure 2:
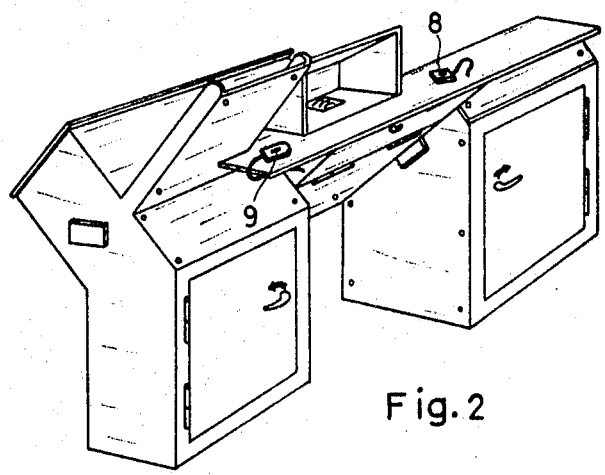
FIG. 2 is the same view but from the front side.

The apparatus of the present invention in detail is formed of a cabinet apparently similar to a desk 1 (FIGS. 1 and 2), at the rear side of which may be seen the inclined feeding surface 2 for the phials or tubular bodies, the casing 3 which covers the stepped conveyor device, the guard cover 4 of the checking inspection aperture, the packing device 5, the discharge passage for the rejected phials or tubular bodies 6, the collecting box 7 thereof.

At the front of the apparatus (FIG. 2) the operator has push button controls 8 for the discharge device of the tubular bodies or phials to be discarded and 9 respectively for the motors controlling the machine.

The inclined charging surface 2 (FIG. 3) is defined at the sides by parallel walls 10 and 10' and at the bottom by the converging walls 11 and 12 which compel the phials or tubular bodies to flow together to form columns in the curved passage 13.

The plate 11, secured by the screw 14, may easily be replaced to adapt it to the various dimensions of phials or tubular bodies to be inserted in the apparatus.

Disposed on the wall 12 is the wedge-shaped push member 15, provided with reciprocating motion, since it is secured to the displaceable rod 16, which push member agitates the phials or tubular bodies which descend the inclined surface 2, compelling them to arrange themselves within the passage 13.

The end of the first push member 17 (FIG. 4), rigidly connected to the reciprocating rod 16, is in a position of rest on the extension of the concave wall of the passage 13.

Figure 5:
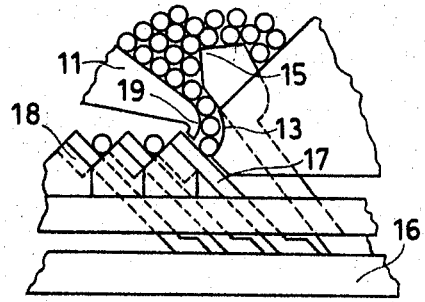
FIG. 5 shows the same device in the working position.

When the push member 17 advances (FIG. 5), together with the rod 16, it compels the phial or tubular body in contact with the end of the rod, to advance beyond the first fixed wedge shaped step 18 of the conveyor device.

Figure 4:
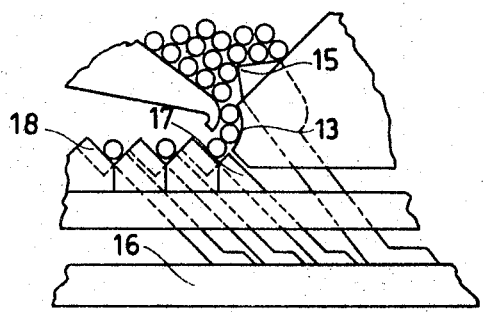
FIG. 4 is a detail of the feeding device, in a position of rest.

When the push member 17 returns to its original position, a new phial or tubular body is in contact with the fixed step 18, beginning the cycle again in such manner (FIG. 4).

The convex outline 19 of the end portion of the plate 11 prevents piling up of the phials or tubular bodies within the passage 13 by defining the flow thereof.

Figure 6:
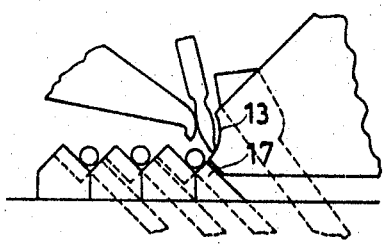
FIG. 6 shows the same in a particular working position.

The passage 13 is curved in order to prevent any phial which may inadvertently or for any reason drop onto the feeding surface, returning to the push member 17 and breaking itself thereon (FIG. 6).

Figure 3:
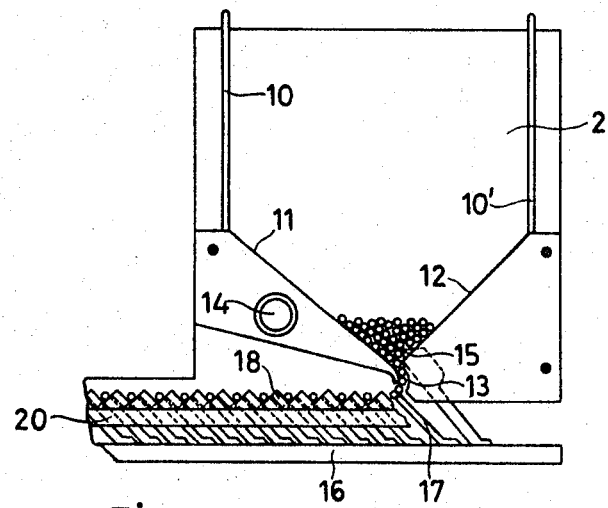
FIG. 3 is the inclined feeding surface and the initial portion of the stepped conveyor device.

The fixed wedge shaped steps 18 in FIG. 3 are disposed tightly side by side and secured to the fixed rod 20.

Formed in the side of each fixed step 18 is a slot, through which a push member 17 passes which, in such manner displaces, with every working cycle, the phial or tubular body on the next fixed step.

The phials or tubular bodies therefore continuously advance along the stepped conveyor device which however, is continuously fed by the inclined surface 2.

The motion imposed on the phials in the transfer from one step to the other causes the discharge of any liquid in the neck of the phial, in its lower body, avoiding the formation of bubbles during the centrifuging and also compelling impurities to be deposited on the bottom before the phials or tubular bodies reach the checking position.

Visual control will therefore be limited to the lower area of the phials, a feature which facilitates this operation.

Figure 7:
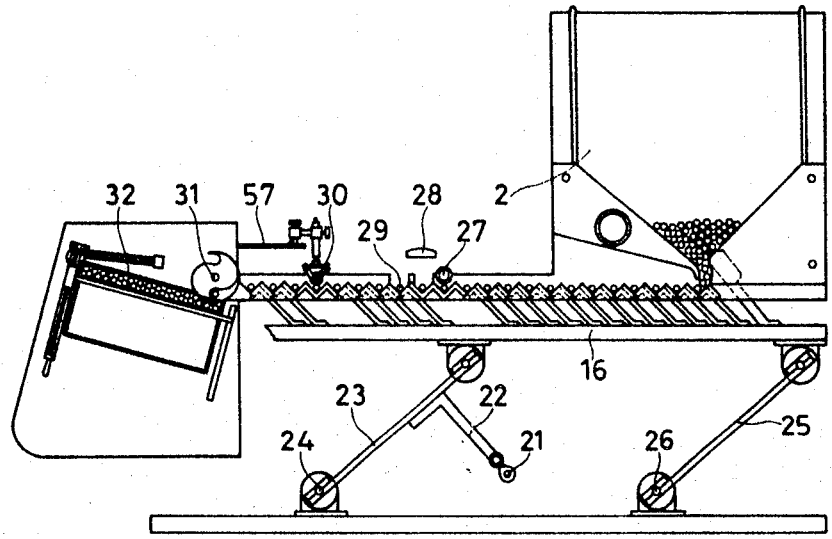
FIG. 7 is a view of the entire assembly of mechanisms associated with the inclined feeding surface, the stepped conveyor device and the packing device.

The reciprocating motion of the rod 16, (FIG. 7) is controlled by the cam 21 continuously rotated by an electric motor, which cam acts by way of the rod 22 on the bar 23 pivoted at 24 on the fixed frame of the machine and which forms together with the bar 25, pivoted at 26 and on the bar 16, a deformable parallelogram. The weight itself of the bar 26 and of the push members secured thereto, ensures contact of the rod 22 with the cam 21 in any position.

The rotating roller 27 rests at intervals on the phials or tubular bodies advancing on the stepped conveyor device and rotates then in such manner, just before they are subjected to optical control according to the axis of the lens 28.

Discharge of the phials or tubular bodies not found suitable by the operator as a result of checking takes place at position 29. In the next position 30 the scoring operation of the phials takes place by means of the device which will be described in greater detail below.

The rotating shaped cam 31, located at the end of the stepped conveyor, rejects the phials or tubular bodies therefrom to introduce them within the packing device 32 which will also be described in greater detail hereinafter.

Figure 8:
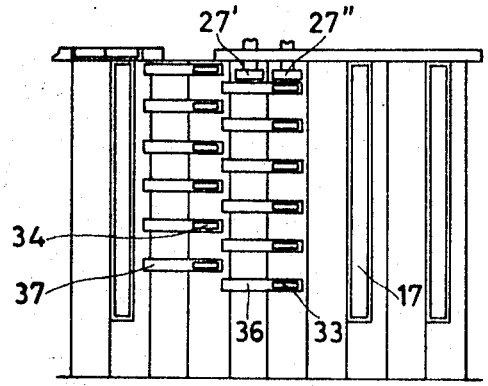
FIG. 8 is a plan view of the centre portion of the stepped conveyor, shown in the checking and discharging position.

Located at the position for rotation and checking (FIG. 8) are the special push members 33 and 34, synchronously controlled by the push members 17 in order to retain for a longer time the phials or tubular bodies in the above mentioned positions of rotation and checking.

The push members 33 and 34 which, in the resting position are below the stepped surfaces 35 (FIG. 9) extend out of the slots 36 and 37 (FIG. 8) simultaneously with the advancing movement of the normal push members 17, thus becoming located in the position shown in FIG. 10.

Figure 9:
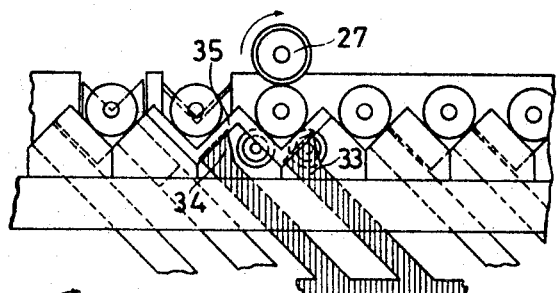
FIGS. 9, 10 and 11 are schematic front views of the same portion of the stepped conveyor device, in three successive working positions.
Figure 10:
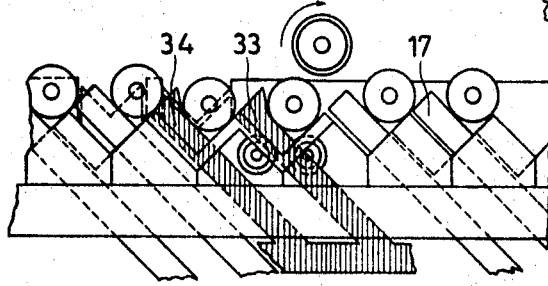
Figure 11:
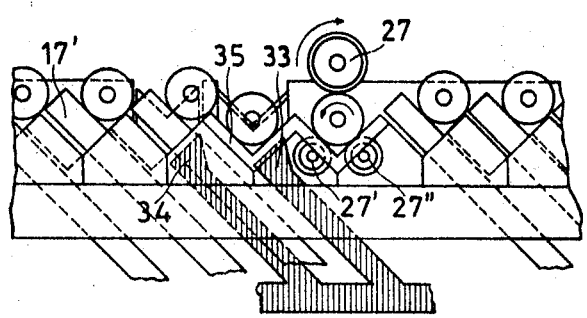

Immediately behind the push members 33 and 34 (FIG. 11) they are displaced laterally, leaving the phials or tubular members 3 which are in the two positions of rotation and checking which in such manner maintain direct contact with the stepped surfaces for an appreciably long time, that is to say until the push members 33 and 34 become disposed again in the positon shown in FIG. 9.

During this phase, the roller 27 (FIG. 11), is lowered onto the phial or tubular body, which rests on the bearing 27' and 27", and rotates it together with the liquid contained therein which is compelled in such manner to suspend any impurities present therein.

Figure 12:
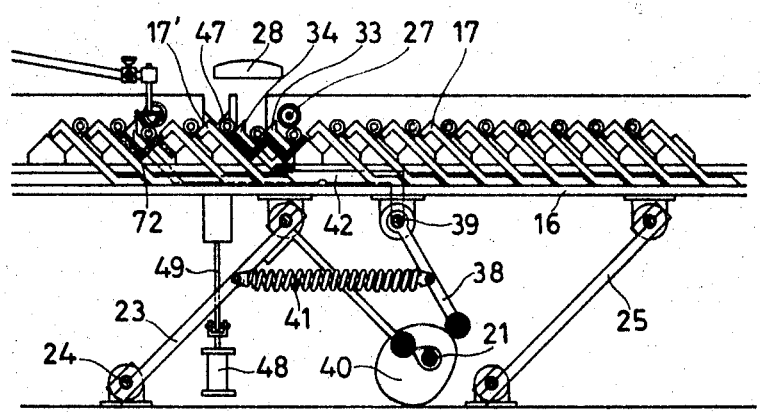
FIG. 12 shows the control mechanism of the stepped conveyor.

The movement of the special push members 33 and 34 is synchronised with that of the push members 17, by means of the lever 38 (FIG. 12) rotatable at 39 and actuated by the moulded cam 47, coaxial with the cam 21. The lever 38 is kept in contact with the cam 40 due to the action of the spring 41, connecting lever 38 to the lever 23.

The lever 38 is connected to the bar 42 at the end of which are secured the special push members 33 and 34, which, in one embodiment, may be constituted of a single piece moulded in the shape of a fork.

The centre of rotation 39 of the lever 38 is secured to the same moveable rod 16 carrying the normal push members 17. The movement of the special push members 33 and 34 thus results from the combination of the movement of the normal push members 17 and a movement of rotation of the lever 38 relatively to its fulcrum 39.

It is therefore, obvious that when the special push member 34, rotating about the fulcrum 39 is lowered below the stepped surface 35 (FIG. 11) the latter is inserted within a cavity formed on the first of the successive normal push members 17'.

Figure 14:
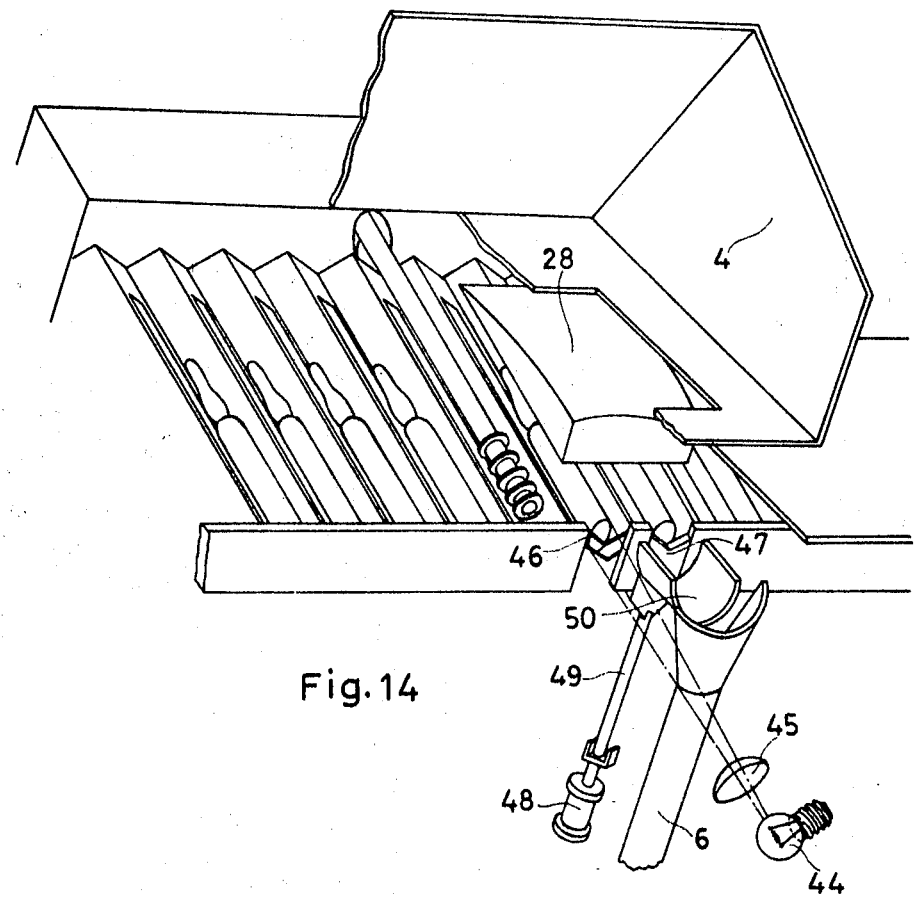
FIG. 14 shows the checking and discharge positions of the stepped conveyor device.

The phial or tubular body which is in the checking position, is observed by the operator, through the special cylindrical lens 28 (FIG. 12) which is suitably moulded, as shown in FIG. 14.

In this position the phial or tubular body is illuminated by the light source 44 through the lens 45 which acts as a light condenser.

Figure 13:
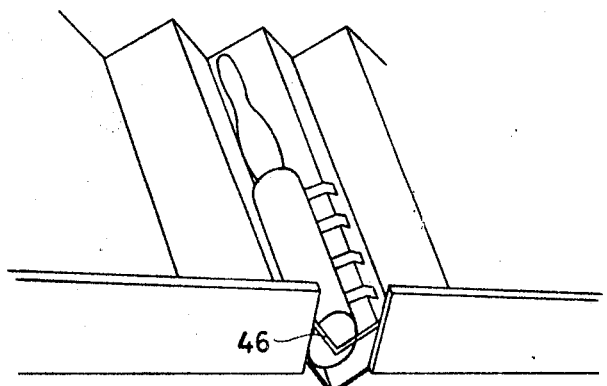
FIG. 13 is a magnified detail of the stepped conveyor in the checking position.

The phial is kept in the position for checking by the single V-shaped wire 46 (FIG. 13) thus leaving sufficiently open the passage for the beam of light from the source 44. The hood 4 (FIG. 14) limits the intensity of the light from the exterior, concentrating the attention of the observer on the phial below the lens 28.

In the following position of the stepped conveyor, the phials or tubular bodies are retained by the roller shutter 47 which may be lowered operating the electro-magnet 48 which acts by means of the draw bar 49 on the roller shutter 47. The push button 8 (FIG. 2) actuated by the operator, effects the closure of the circuit feeding the electro-magnet 48, a feature which takes place however, only subsequently, when the phial or tubular body judged unsuitable by the operator is in the position corresponding with the roller shutter 47.

The rejected phial or tubular body descends by gravity into the collector 50 (FIG. 14) which discharge it into the passage 6.

The phials or tubular bodies considered suitable are transferred along the stepped conveyor until they reach the scoring device (FIG. 17).

Figure 21:
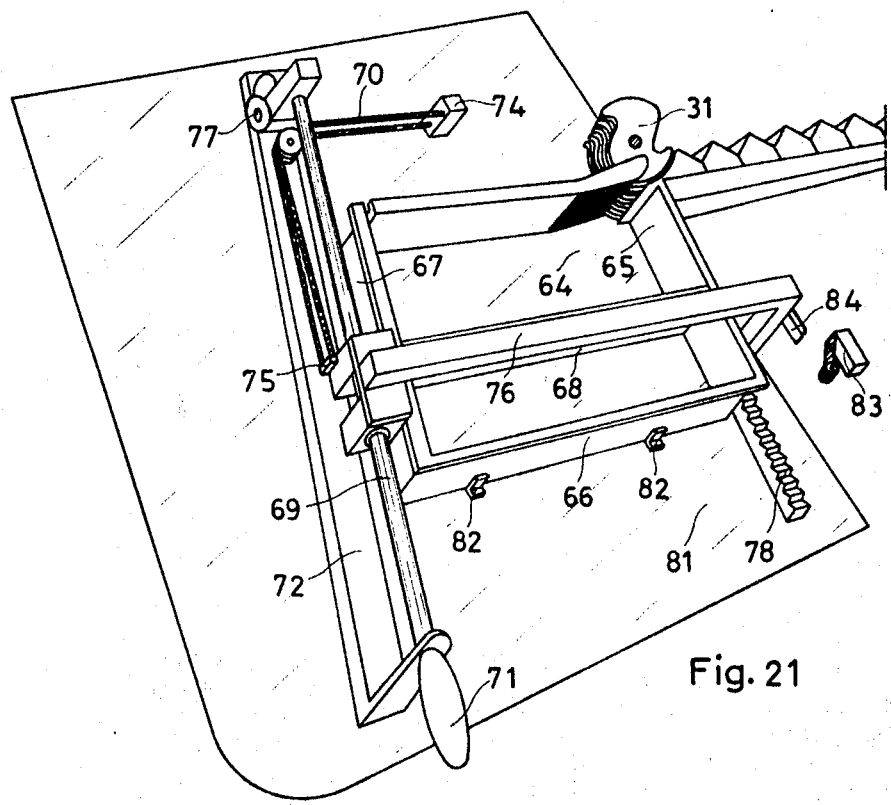
FIG. 21 is a perspective view of the packing device unit.

A special push member 72 (FIG. 21) is disposed at this position in the stepped conveyor and is connected to the same bar 42 to which the special push members 33 and 34 are secured. In this case also this arrangement is to allow the phial or tubular member subjected to the scoring operation to remain longer in the corresponding position of the stepped conveyor. In this position the phial or tubular body is rotated by the rotatable roller 51 (FIG. 17) which is lowered thereon simultaneously with the diamond points 52 and 53 carried by the shaft 54 resiliently guided within the sleeve 55 (FIG. 15) carried in turn by the clamp 56.

The latter is fixed to the bar 57 having an angular reciprocating motion downwardly, around its fulcrum 73.

The scoring pressure is determined by the spring 58 (FIG. 15) and is adjustable by the screw 59.

The spring 58 acts on the shaft 54 displaceable within the sleeve 55 which the limits fixed by the threaded pin 60.

The phials or tubular bodies passing beyond the scoring position, proceed along the stepped conveyor until they reach the rotating cam 31 (FIG. 18) which rotates, synchronised with the movement of the push members 17 being provided with two recesses 61 and 62 within which the phials and tubular bodies drop at the end of their journey over the stepped conveyor.

Figure 18:
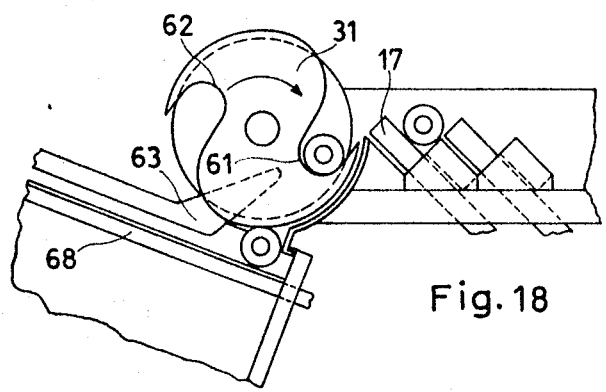
FIGS. 18, 19 and 20 show three successive positions of the packing device.

In the position shown in FIG. 18, the phial or tubular body drops, urged by the push member 17, into the recess 61 of the cam 31.

Figure 19:
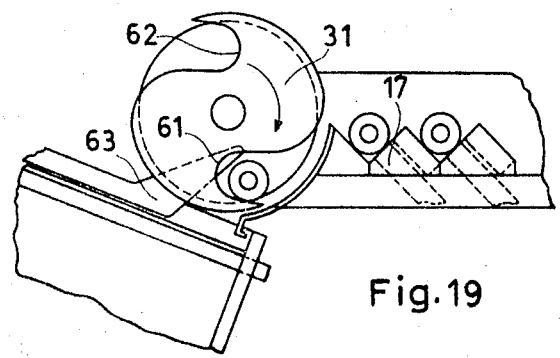

The latter rotates in the direction indicated by the arrow, moving successively to the position shown in FIG. 19 where the phial or tubular body meets the contour of the extractor comb 63 which compels it to descend into the packaging device.

Figure 20:
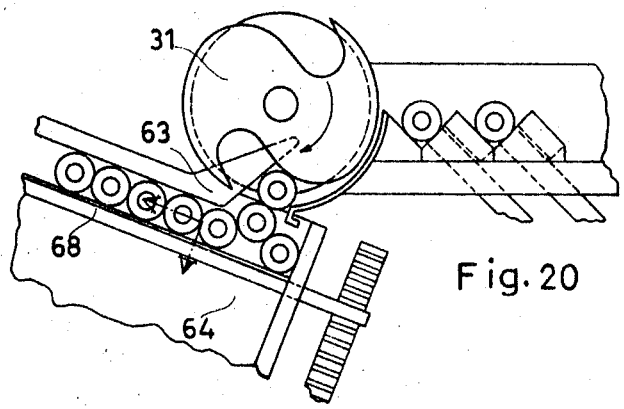

Mounted on the latter is the case 64 (FIG. 20) defined by the side walls 65, 66 and 67 (FIG. 21) within which is the moveable wall 68, freely displaceable on the guide 69 and counter balanced by the springs 70 secured at one end to the fixed block 74 and at the other to the first of the blocks 75 carrying the bar 76 to which the displaceable surface 68 is secured.

The displaceable wall 68 is displaced by the simple pressure of the phials or tubular bodies which descend under the thrust of the cam 31 (FIG. 18).

The phials or tubular bodies introduced in succession by the cam 31 in the case 64 compel the elements which have already descended into it to arrange themselves in regular columns running along a wall 68 (FIG. 20) until reaching the wall 67 (FIG. 21) after which the following phials or tubular bodies compel the moveable wall 68 to advance in order to permit the formation of another row of items.

In this way the case 64 is filled and is completed when the displaceable wall 68 is in contact with the base wall 66 of the container 64.

At this point, the displaceable wall 68 is raised, together with its guide 69, operating the knob 71 and rotating the rod 72 on the pivot 77 until raising the displaceable wall 68 above the case 64 which in such manner may be easily extracted and replaced by another empty case.

Figure 22:
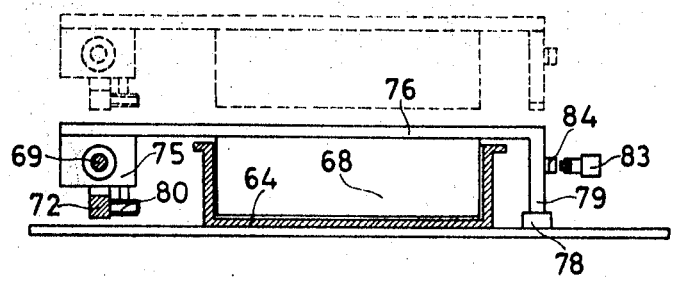
FIG. 22 is a cross section thereof.
Figure 23:
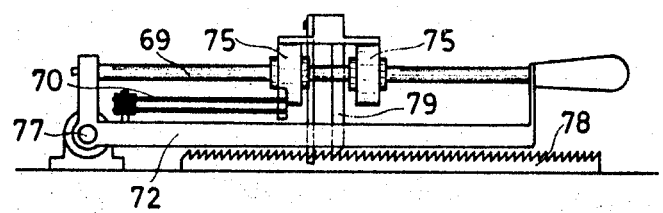
FIG. 23 is a side view thereof.

The saw toothed rack 78 (FIGS. 21 and 23), on which the tooth 79 engages, fixed to the bar 76 (FIG. 22) carrying the displaceable wall 68, prevents the latter from returning upwardly under the action of the springs 70, which would return the phials or tubular bodies to the recesses in the shaped cam 31. The roller 80 fixed to the block 75 (FIG. 22) sliding over the fixed bar 72, guides the advancing movement of the displaceable wall 68, preventing it from sweeping over the base surface of the case 64.

The latter is retained on the base surface 81 (FIG. 21) by the stop squares 82. The microswitch 83, actuated by the block with an inclined surface 84 when the case 64 is completely filled, stops the machine, permitting the operator to replace the full case with an empty case easily.

What is claimed is:
1. An apparatus for scoring and checking impurities in phials and the like, comprising in combination:
   (a) a feeding device having an inclined surface for the supply of filled phials;
   (b) a stepped conveyor device having push members and means actuating said push members for transferring said phials one step at a time;
   (c) a roller and means rotating said roller and moving it in engagement with a phial for rotating the phial to provide a suspension of impurities in the liquid filling the phial;
   (d) a checking station having a device for illuminating the last-mentioned phial and a lens for viewing the last-mentioned phial;
   (e) a device for discharging rejected phials from said stepped conveyor;
   (f) a device for scoring the necks of the phials; and
   (g) a phial packing device located at the end of said stepped conveyor.
2. An apparatus in accordance with claim 1, wherein the inclined surface of said feeding device has a curved outlet passage leading to said stepped conveyor, said feeding device having a reciprocating agitator for arranging phials within said passage.
3. An apparatus in accordance with claim 2, wherein said outlet passage has interchangeable walls, whereby the width of the passage is adapted to phials of different diameters.
4. An apparatus in accordance with claim 1, wherein said stepped conveyor comprises a series of fixed wedge-shaped elements located side by side and having slots, said push members extending through said slots.
5. An apparatus in accordance with claim 4, wherein said stepped conveyor comprises a supporting bar carrying said push members, a lever pivoted to said supporting bar, and other special push members fixed to said lever and located adjacent said roller.
6. An apparatus in accordance with claim 1, wherein said discharging device comprises a roller shutter located immediately after said checking station and means lowering said roller shutter to discharge rejected phials.
7. An apparatus in accordance with claim 5, wherein said lowering means include an electromagnet.
8. An apparatus in accordance with claim 1, wherein the means rotating said roller rotate it at an adjustable speed and wherein said scoring device comprises at least one incising member, a shaft carrying said incising member and means connected with said shaft for lowering said incising member upon the neck of a phial rotated by said roller to incise a furrow around the entire neck of the phial.
9. An apparatus in accordance with claim 1, wherein said phial packing device comprises a cam located at the end of the stepped conveyor and a removable case, said cam transmitting the phials into said case.
10. An apparatus in accordance with claim 9, wherein said phial packing device further comprises means constituting a counterbalanced movable limiting surface and guides supporting said surface.
11. An apparatus in accordance with claim 10, wherein said phial packing device further comprises a movable shaft supporting said limiting surface, said shaft having a knob at one end and being pivoted at the other end, whereby said shaft along with the limiting surface may be raised manually to permit removal of a filled case.
12. An apparatus in accordance with claim 11, wherein the last-mentioned shaft comprises a tooth, said phial packing device further comprising a saw tooth rack meshing with said tooth to prevent a return movement of the shaft.
13. An apparatus in accordance with claim 12, said apparatus further comprising a motor drive, a microswitch operatively connected with said motor drive and means carried by the last-mentioned shaft and connected with said microswitch for actuating said microswitch to stop said motor drive when a case has been filled.

References Cited
UNITED STATES PATENTS

| | | | |
|---|---|---|---|
| 2,236,945 | 4/1941 | Gibbs | 53—78 X |
| 2,732,987 | 1/1956 | Moore. | |
| 2,987,182 | 6/1961 | Ator et al. | 88—14.5 X |
| 3,217,877 | 11/1965 | Honjyo et al. | 209—111.7 |
| 3,241,433 | 3/1966 | Niederer et al. | 88—14.5 |

TRAVIS S. McGEHEE, Primary Examiner